Patented Sept. 1, 1942

2,294,431

UNITED STATES PATENT OFFICE 2,294,431

PURIFICATION OF ZIRCONIUM COMPOUNDS

Eugene Wainer, Niagara Falls, N. Y., assignor to
The Titanium Alloy Manufacturing Company,
New York, N. Y., a corporation of Maine No Drawing. Application July 31, 1941,
Serial No. 404,876

13 Claims. (Cl. 23—23)

This invention relates to the preparation of zirconium dioxide and other zirconium compounds of high purity. More particularly, it relates to the removal of impurities from ores containing zirconium dioxide or other zirconium ores. Still more particularly, it relates to the purification of zirconium ores by the preparation of certain sulfate derivatives of zirconium. Finally, it relates to the preparation of an improved type of zirconium oxide by calcination from zirconium oxysulfate.

The most common and economical sources of zirconia are baddeleyite, mainly zirconium dioxide with a $ZrO_2$ content varying from 60% to 95%, and the various types of zircon, or $ZrSiO_4$. The chief impurity in baddeleyite, other than more or less iron and zircon, is silica, either as one of its mineralized forms or as a silicate. Zircon minerals are found as two general types: (1) as a very fine sand, usually on beaches or other watershed areas, resulting from granitic weathering; and (2) as massive deposits of igneous origin. The massive zircons of igneous origin contain considerable quantities of impurities as an integral portion of the crystal, such impurities usually being iron oxide or silicate varying from a few tenths of a percent up to several percent. The massive zircons of North Carolina in the U. S. and the hyacinth of France are familiar examples. Although some of the impurities, such as quartz, feldspar, etc., in baddeleyite and in massive zircons may be removed by mechanical, magnetic and electrical methods, particularly with selective crushing to minus 20 to 40 mesh, a major portion of the iron oxide content is part of the zirconia mineral itself and complete mechanical separation of this ingredient is not commercially feasible.

The preparation of pure white zirconium dioxide from solutions containing considerable quantities of dissolved iron, manganese, etc. is normally a difficult and expensive procedure. An ideal procedure would be the precipitation of a zirconium compound insoluble in fairly strong acid, iron and other possible coloring agents remaining in solution, such insoluble zirconium compound being easily transformed to the oxide by calcination. Zirconium compounds which appear to fall in this category are the basic or more properly oxysulfates of zirconium, most or all of which have already been described. Such oxysulfates are definite compounds in the form of hydrates, in which the proportion of zirconium to sulfate varies from a ratio of 2 mols of $ZrO_2$ to 3 mols of $SO_3$ to a ratio of 4 mols of $ZrO_2$ to 1 mol of $SO_3$. Many of these oxysulfates or combinations of said oxysulfates are insoluble in dilute acid and serve as a means of removing coloring impurities such as iron and the like by filtration of the precipitate. Most or all of these substances have been formed by previously described procedures, but such procedures require either excessive dilution, or thermostatic temperature control, or excessive time for the precipitate to form, or are not quantitative, or the compounds precipitate in a form difficult to handle in modern chemical equipment, or the acidity at which the compound precipitates or is insoluble is too low to be of active value for removal of colored oxides on washing with water.

For example, previous investigators have shown that the best conditions for precipitation of the oxysulfate $4ZrO_2 \cdot 3SO_3 \cdot 14H_2O$ are: (1) a sulfate solution practically free from the sulfates of Na, K and Ca; (2) an initial acidity of about 0.5 percent and a maximum acidity of not more than 3.5 percent; (3) sufficient dilution; and (4) proper temperature control. Thus a relatively pure starting material is necessary, and of rather definite acid concentration. Dilution of at least 50 parts of water to 1 part of sulfate and preferably 100 parts of water to 1 part of sulfate is recommended and the temperature must be accurately controlled during precipitation at 39.5° C. Furthermore, the greater the amount of iron and titanium present the greater the dilution required. Another procedure requires autoclaving of zirconium hydrate with HCl and $H_2SO_4$ for a lengthy period at 200° C., the maximum concentration permissible being 9 percent $Zr(OH)_4$. Another method requires the preparation of a special chloride derivative of zirconia by a roundabout procedure, adding sulfuric acid and precipitating the basic sulfate $5ZrO_2 \cdot 2SO_3$. This procedure, besides requiring the formation of a special chloride then requires a dilution of at least 30:1 before precipitation occurs. In still another method a dilute solution of zirconium oxychloride (30 to 1) is acidified with HCl in the proportion of about one mol of HCl for each mol of $ZrO_2$, treated with $H_2SO_4$ and zirconium oxysulfate of the formula

$$5ZrO_2 \cdot 3SO_3$$

precipitated therefrom. This method also requires high dilution, and is characterized by a considerable excess of acid.

It is therefore an object of this invention to eliminate impurities from crude zirconium dioxide by the preparation of insoluble zirconium oxysulfate, which results in practically quantitative yields of the $ZrO_2$ content of the original solutions or ores in a high state of purity and of brilliant white color. It is another object to provide a procedure for the preparation of such zirconium oxysulfate in a relatively short time, such as a few hours. It is a further object to provide a procedure for the preparation and precipitation of such oxysulfate with relatively small amounts of precipitating liquor, such as a concentration equivalent to 100 to 400 grams of $ZrO_2$ per liter of precipitating liquor to be made or roughly 120 to 480 grams of the oxysulfate per liter of liquor. It is another object to prepare an improved type of zirconium oxide by calcination from zirconium oxysulfate. Other objects will appear hereinafter.

These objects are accomplished by mixing the ions of $ZrO^{++}$ (zirconyl), $SO_4^{--}$ (sulfate), and an acid radical other than sulfate, particularly $Cl^-$ (chloride), the proportion of zirconyl ion to sulfate ion being between 2 to 3 and 4 to 1, and containing such an amount of water as to result in a highly concentrated sludge or solution. The solution is then filtered if necessary, heated to between 90° C. and 50° C. so as to evaporate to dryness, or form a calcine. The precipitated zirconium oxysulfate which forms is freed from impurities by leaching with water and/or dilute acid followed by filtration and washing. Ions such as of or containing ammonium, lithium, sodium, potassium, calcium, copper, magnesium, zinc, aluminum, manganese, iron, cobalt, nickel and others, either as originally present or as added, may be removed by this procedure. When the silica content of the final product must be low, the starting material must also be low in silica, inasmuch as the present procedure is not applicable to the removal of silica.

The raw material used in the practice of this invention may vary widely in all the usual impurities normally occurring with zirconium ores, with the exception of $TiO_2$ and $SiO_2$. Satisfactory starting materials should contain 10 percent or less total silica and the lower the silica content the better the ore for the present purposes. Much of the $TiO_2$ is removed by the process of the present invention, but should not normally exceed 2 to 3%. In the case of baddeleyite, much or all of the siliceous material is invariably present as a separate and discreet mineral as is the case for the titanium dioxide content. The silica and titania may be lowered below the prescribed limits for these impurities by crushing selectively to the proper particle size and separating by means of jigging tables for gravity separation, heavy liquids for sink and float separation, magnetic, electrostatic, electric, and/or froth flotation.

The silica content of natural baddeleyite or zircon may be lowered below the prescribed limits by fusing with a heavy excess of caustic soda, and the resultant melt leached with water to remove alkali silicates, so that the residue contains practically all the zirconia with zero to less than 10% silica. In the case of siliceous baddeleyite the finely divided ore may be attacked with $H_2SO_4$ at 400 to 500° C. and leached with water to dissolve zirconium sulfate, leaving the silica and silicates as a discardable residue insoluble in $H_2SO_4$. The clarified solution may then be evaporated and calcined to $ZrO_2$. However, a more applicable procedure from a commercial standpoint involves the heating of the siliceous ore in the presence of carbon to a temperature high enough to either volatilize off the silica or to transform it into a chemical condition susceptible to mechanical means of separation from the zirconia. When this is done in an arc furnace of the Siemens-Halske single electrode pot type, the calcined residue (to transform carbides and nitrides to oxides) will have an analysis of 90 to 98% $ZrO_2$, 0.5 to 7% silica, the iron and titania with which the furnace feed ore was originally invested, and small amounts of calcium and aluminum introduced from the coke ash. Another electric furnace procedure involves the use of the graphite type of resistance furnace, in which the silica is transformed into a coarse structured siliceous carbide easily removed by simple screening to yield an oxide after calcination containing 95 to 99% $ZrO_2$ and 0.5 to 2.0% silica plus small amounts of other impurities.

The next step is to transform the raw or mechanically purified baddeleyite, or otherwise preliminarily purified zirconia into alkaline earth, or mixed alkali-alkaline earth zirconates, by fusion with alkali, alkaline earth or mixed alkali-alkaline earth oxides, hydroxides, carbonates or sulfates. Materials such as the oxides of magnesium, beryllium, zinc, copper, iron, manganese, nickel and so forth may replace the alkalis or alkaline earths but for economical and other reasons the latter are preferred. The transformation to zirconate is necessary only when the zirconia is insoluble in dilute acids of 10 to 20% content. The material obtained as a residue from caustic fusion is directly soluble in acid and need not be further transformed. However the naturally occurring zirconia such as baddeleyite, or the zirconia residue from high temperature treatment in electric furnaces are all insoluble in dilute mineral or organic acids and must be further treated to become acid soluble.

This may be accomplished by mixing one mol of impure baddeleyite, or zirconia prepared as above, with one mol or less of soda ash, or limestone, or a mixture of soda ash and limestone. The ore, alkali, and alkaline earth all should be fine enough to pass a 300 mesh screen before mixing. The mixture is calcined for a specified length of time at a definite temperature in order to convert the $ZrO_2$ to sodium or calcium zirconates. In mixtures containing soda ash, the calcination is preferably carried out in closed saggers or crucibles, in order to prevent the volatilization and loss of sodium compounds, particularly in contact with the products of combustion of the usual fuels. By filling a crucible or sagger with the raw charge and covering with a well fitting lid elimination of soda from the zone of reaction and direct contact with fuel combustion products is prevented and a complete reaction is obtained with the proper amount of soda. In the presence of lime or other alkaline earth, the loss of soda is retarded to a considerable extent. Such precautions need not be observed where limestone alone is used. In place of soda ash the use of salt cake and coke may be used to furnish the alkali for the roast but the use of soda ash is preferred. To furnish lime for the roast, hydrated lime, quick lime or limestone containing at least 95% $CaCO_3$ and of sufficiently finely divided nature may be used.

In the practice of the present invention, the preferred zirconate is sodium zirconate, particularly if impurities such as $MnO_2$, $U_3O_8$, $WO_3$, $MoO_3$, etc., are present. To prepare sodium zirconate, a mixture of soda ash and a material containing zirconia is calcined in full covered saggers or crucibles at 950° to 1100° C. for a time equivalent to at least one hour for each inch of thickness of charge through which the heat must pass and preferably up to 1½ hours. A sodium calcium zirconate which is equimolecular in soda and lime is calcined at 1000° to 1150° C. in closed crucibles, the period of heating preferably being 1½ hours for each inch of heat penetrable thickness. Calcium zirconate is calcined to 1050° to 1200° C. for 1½ hours for each inch of heat penetrable thickness and may be carried out in closed or open crucibles or on a muffle floor. Reaction is usually incomplete below the lower temperature limit but the temperature may exceed the upper temperature limit by a considerable amount. When the silica content approaches the allowable limit of 10% the temperature of calcination should not exceed the upper temperature limits and preferably should remain within 50° C. of the lower temperature limit to prevent hard sintering or fusion of the calcine.

The properly prepared calcined zirconate is normally a soft, easily disintegrable product which can be treated in the next step without further mechanical comminution or handling with the exception of those zirconia sources which contain more then small quantities of acidic oxides such as $MnO_2$, $WO_3$, $MoO_3$, $U_3O_8$. In this case calcines containing soda are used, and after calcination are milled with water in a ball mill for a few hours and the slurry filtered and washed by means of which the above acidic oxides are removed as their alkaline salts. If the original zirconia source does not contain more than traces of these oxides, and if the silica content of the original ore is low, or if the silica content of the final product is immaterial for its subsequent uses, it may be dissolved directly in HCl with the required amount of sulfate ion and then treated as hereinafter pointed out.

The acid soluble zirconia prepared as outlined above, or any other acid soluble zirconia, is then treated in accordance with the present invention to form a solution containing zirconyl, sulfate, and other acid ions, such as chloride ions. Part of the soda of sodium zirconate may, if desired, be removed (prior to dissolving) by water leaching in order to reduce the quantity of acid necessary to dissolve the zirconia. The sodium zirconate may be divided into two portions, one portion dissolved in hot HCl and the second portion dissolved in hot $H_2SO_4$, the two clarified and then mixed, with or without the addition of limestone. The sodium zirconate may be dissolved in $H_2SO_4$ and zirconium oxychloride solution added or mixed therewith. The sodium zirconate may be dissolved in a combination of HCl and $H_2SO_4$ sufficient to just dissolve the zirconia, and the liquor clarified. The sodium zirconate may be treated with a combination of HCl and zirconium sulfate below 40 to 50° C. sufficient to dissolve the zirconate or with a mixture of $H_2SO_4$ and zirconium chloride below 40 to 50° C. sufficient to dissolve the zirconate, and the liquor then clarified, with the addition, if necessary, of limestone or other material containing a basic ion. Clarification is necessary only when any insoluble matter discolors the final product. The soda lime zirconates and the lime zirconates may be treated by essentially the same general procedures except that when considerable lime is present and HCl and $H_2SO_4$ are added to separate portions the two liquors are cooled, combined, and thoroughly stirred before clarification prior to precipitation is made. In dissolving the zirconates in acids, the quantity of acid required to bring a completely reacted zirconate into solution is 4 normal weights of such acid, and the sum total of combinations of acid used to bring the normal zirconates (one molecular weight) into solution need not exceed 4 normal weights of such acid. However, in the case of the previously water washed zirconates containing soda the amount of acid used is decreased by an amount equivalent to the soda or other alkali eliminated by the water leach.

Instead of dissolving an acid soluble zirconia in hydrochloric acid, it may be dissolved in other suitable acids, to form a solution of a zirconyl salt. Alternatively, solutions of zirconium salts may be formed by any other method, such as hydrolyzation of $ZrCl_4$. The zirconium may be present originally as a solution of any salt whose acid radical has a lower boiling or decomposition point than $H_2SO_4$, and which does not form insoluble precipitates under the conditions outlined herein. Such salts are the chloride, nitrate, acetate, carbonate, etc., the chloride being preferred, and the nitrate being the next best. Also satisfactory starting points are any other acid soluble zirconia or zirconium hydrate, whether or not they are highly loaded with impurities. Such acid soluble zirconia or zirconium hydrate may be dissolved in acid, such as hydrochloric acid alone, or hydrochloric acid plus sulfuric acid, as pointed out above.

The second necessary ingredient is the sulfate ion, added either as a dry material or in solution form. Any sulfate may be added whose chloride is soluble in water or dilute acid to the extent of at least 5 grams per 100 cc. of solution, the more soluble the better, while the solubility of the sulfate in water or dilute acid is at least 1 gram per 100 cc. of solution, the more soluble the better. The sulfate added may be sulfuric acid or any of the sulfates or bisulfates of ammonium, lithium, sodium, potassium, calcium, copper, magnesium, zinc, aluminum, manganese, iron, cobalt, nickel, and many other metals which are less economically practical, or the normal or acid sulfate of zirconium itself. In fact the sulfate or bisulfate of any metal which does not form highly insoluble precipitates under the conditions outlined herein may be used. The neutral sulfates, particularly of calcium and sodium (because of their cheapness, ready availability and white color) are preferred. It will be noted that, in the case of calcium sulfate, despite the fact that a relatively insoluble material is employed, it goes completely into solution when added to the solution containing zirconyl ion, due perhaps to the fact that a complex ion is formed. This was entirely unexpected.

In the case of sulfuric acid, the bisulfates, and zirconium sulfate (which should actually be termed a bisulfate), it may be desirable to add separately or together an amount of basic ion, preferably as $CaCO_3$ or $Na_2CO_3$, sufficient to neutralize the excess acid or hydrogen ion introduced thereby. However, this is not necessary in view of the fact that the subsequent heating step drives off hydrogen chloride.

In the practice of the present invention, however, it is not absolutely necessary that the excess acidity be neutralized. The reason for this is that, in the subsequent heat treatment as hereinafter described, free HCl is eliminated by volatilization, so that unless acidity introduced by $H_2SO_4$ exceeds the amount of chloride ion present the excess acidity will be entirely eliminated.

In practice, the sulfate is preferably added as

Na₂SO₄, or CaSO₄. Under some economic conditions zirconium sulfate is preferred, since this will increase the final yield of ZrO₂. The zirconium sulfate used can be prepared by sulfating the original ore to form water soluble zirconium sulfate, in well known fashion. The quantities of any of these basic ions present, either as originally present or as added, may exceed to a considerable extent equimolecular proportions in relation to the sulfate or even the zirconyl ions present, and the alkali metals are no exception to this statement. This is surprising in view of the extremely soluble complexes usually formed by salts of zirconium with alkali metal salts.

The amount of sulfate added may vary anywhere between the ratio of 2 mols of ZrO₂ to 3 mols of sulfate and the ratio of 4 mols of ZrO₂ to 1 mol of sulfate. A zirconium sulfate containing more than the above amounts of SO₃ may be reduced to the proper ratio of ZrO₂ and SO₃ by calcination to 800 to 850° C. for a short period to eliminate part of the sulfate. The amount of sulfate added depends on the amount and type of impurities present. As a general rule the greater the amount of impurities the closer the amount of sulfate will approach the ratio of 2 mols of ZrO₂ to 3 mols of sulfate and the less the amount of impurities the closer the amount of sulfate will approach 1 mol of sulfate to 4 mols of ZrO₂. Actually the ratio of 4 to 1 is used only in solutions whose iron content is negligible or absent, since the compound 4ZrO₂.SO₃ exhibits a slight but definite solubility in the hydrochloric acid usually used in the subsequent digestion. The 2 to 3 ratio is used only rarely also for the same reason, the preferable limits being 1ZrO₂:1SO₃ and 5ZrO₂:2SO₃, these limits being usually sufficient for complete precipitation and exhibit sufficient insolubility in HCl to serve as a means of eliminating acid soluble impurities.

In general, it is preferred to mix the various constituents as highly concentrated solutions, but they may be mixed as dry materials, and some water added, or as sludge. They may be mixed simultaneously, or separately, or in any desired order. In any case enough water is added so that intimate mixture of the reactants is possible on stirring. The dilution should be such that the ZrO₂ content is between 100 and 400 grams per liter of solution, or a weight concentration of 10 to 40%. Within these concentration limits complete solution of the ingredients, and subsequently substantially complete precipitation of the ZrO₂ content, with elimination of impurities, is possible. Other than zirconyl, sulfate, etc., ions, the concentration of free acid, particularly HCl, is immaterial, since such free acid is subsequently eliminated in the heat treatment.

The mixture is then evaporated to dryness, and may then be calcined at a suitable temperature. The evaporation and calcination may if desired be carried out as a single heating step. In practice, the latter procedure is preferred, the calcination temperature being between 125° and 850° C., the exact temperature of calcination depending on the amount and nature of the impurities present. For raw materials containing small amounts of impurities, calcination at about 700° to 800° C. suffices to yield an easily handled oxysulfate of zirconium which, after washing with water or dilute HCl to remove impurities, may be subsequently calcined to yield pure white ZrO₂. However, where any considerable quantity of harmful impurities are present lower temperatures of drying or calcination than 750° C. are used. For example, if the amount of iron oxide present is 1% or less a calcination up to about 650° C. may be used; from 1 to 4% iron oxide, temperatures of 500° C. should not be exceeded and for still higher quantities of iron the maximum temperature should be about 350° C. or the temperature usually obtained by evaporation to dryness on an electric hot plate in porcelain ware. Where the original solutions carry traces or negligible quantities of iron, calcination may take place at 750° to 850° C. The reason that lower calcination temperatures are required with higher iron contents is that some or all of the iron tends to become insoluble or at least difficultly soluble. In practice and as a general procedure it is preferred to evaporate and bake for a short period (e. g. 30 minutes to an hour) between 150° and 650° C., where it is evident that small quantities of iron are present, and to evaporate just to dryness or strong fumes of HCl when it is evident that considerable quantities of iron are present.

After the reaction mixture has been dried and calcined as before specified, the product when leached with water separates as a bulky, flocculent, slimy, insoluble precipitate of zirconium oxysulfate. The material is transformed into a more easily handled form by digesting at a slightly elevated temperature (at least 50° C. to 60° C.), preferably with the addition of some strong acid other than H₂SO₄, preferably HCl, to yield a 0.5 to 10% acidity relative to HCl unless such equivalent acidity is already present in the solution constituents. The amount of HCl added is preferably such that it will yield a concentration of free HCl acidity of 2 to 3 percent. As long as no free sulfate ion is present (that is, all sulfate should be combined with ZrO₂ as an insoluble precipitate) enough HCl to yield a free acidity of 10% may be used if desired to bring discoloring ions rapidly in solution. Naturally where chloride ion is present in the original solution mixture and is not completely removed in low temperature calcination, enough HCl to make up the deficiency only is added. For all practical purposes the amount of free HCl over and above the amount necessary to satisfy the impurities need not exceed 0.5 to 3.0%. Enough water and HCl are added to the calcine to yield a concentration of 100 to 400 grams of ZrO₂ per liter of liquor. The liquor plus insoluble material is then digested at 50° to 80° C. for about 30 minutes to an hour which is usually sufficient to cause the precipitate to become granular so that it is easily filtered and washed. The precipitate may then be washed or diluted with water or dilute HCl, the final washing being with 1% HCl to avoid hydrolysis of soluble iron. The product is a pure zirconium oxysulfate, which may be treated further to form other pure zirconium compounds.

The form pure zirconium dioxide, the precipitate is then calcined, such as above 900° C., until all SO₃ fumes are eliminated and a pure white zirconium dioxide of improved type results.

To form other zirconium compounds or salts, the precipitate may be dissolved in H₂SO₄ to form normal zirconium sulfate, and the latter subjected to further treatments if desired.

The invention having been described generally, the following example is given of a specific mode of practicing the same.

*Example*

A baddeleyite containing 80.62% ZrO₂, 4.20%

$SiO_2$, 2.70% $MnO_2$ 8.20% $Fe_2O_3$, 2.40% $Al_2O_3$, 1.25% $TiO_2$, and 0.63% of other materials, including $CaO$, $Na_2O$ and $Cr_2O_3$, is ground to pass a 300 mesh screen. 1250 parts of this baddeleyite is thoroughly mixed with 530 parts of anhydrous soda ash and 500 parts of pure air floated limestone ground to pass a 300 mesh screen. The charge is placed in a crucible just large enough to contain the entire batch, a cover placed on the crucible and the whole calcined at 1035° C. for a time equivalent to 1.5 hours for each inch of thickness through which the heat must pass. This calcined product is divided into two portions, one containing 2000 grams and the other 655 grams.

The first portion weighing 2000 grams is added to a stirred 32% hydrochloric acid solution (sp. g. 1.16), in the proportion of 1 gram of roasted product per 2 cc. of HCl solution. The mixture heats up, and this is allowed to proceed until thickening begins. When this begins, half the volume in water of the mixture is added thereto, and stirring continued until the reaction is completed. After the reaction is completed, the mixture is allowed to settle, and the clear liquor decanted off.

To 390 cc. of concentrated (98%) sulphuric acid (sp. g. 1.82), 780 cc. of water is added. To this the second portion weighing 655 grams is added. The reaction is complete in 3 or 4 minutes. The resulting slurry is immediately added to the clear solution obtained from dissolving the first portion in hydrochloric acid, forming a composite solution containing approximately 5 mols of $ZrO_2$ per 3 mols of sulfate ion. This solution is then baked at about 95° C. for 10 hours to form a hard light yellow crust. This material is broken up, water added, and sufficient hydrochloric acid added to yield 2 to 3% acidity. This slurry is digested at 50° to 60° C. for about an hour, allowed to settle, supernatant liquid poured off, washed with water and 1% HCl, and finally calcined at 925° C. to form a pure white $ZrO_2$ of the following analysis (percentages):

| | |
|---|---|
| $ZrO_2$ | 95.33 |
| $SiO_2$ | 3.6 |
| $TiO_2$ | 0.5 |
| $Fe_2O_3$ | 0.12 |
| $Al_2O_3$ | 0.06 |
| $MnO_2$ | Trace |
| Others | 0.39 |

When percentages or parts are mentioned in the above specification and examples, percentages and parts by weight are understood.

As many variations are possible within the scope of this invention, it is not intended to be limited except as defined by the appended claims.

I claim:
1. The method of purifying crude zirconium compounds or ores, comprising preparing a crude aqueous mixture containing zirconyl ions, sulfate ions, and ions of an acid, other than sulfuric, which has a lower boiling or decomposition point than sulfuric acid and which does not form insoluble precipitates with zirconium compounds, the proportion of zirconyl ions to sulfate ions being between 2 to 3 and 4 to 1, and the concentration of zirconyl ions being such that the zirconium dioxide content is between 100 and 400 grams per liter of liquor, evaporating said mixture to dryness at a temperature between 90° C. and 850° C. to form a precipitate of insoluble zirconium oxysulfate, leaching to dissolve impurities, and separating said precipitate from the dissolved impurities.

2. The method of purifying crude zirconium compounds or ores, comprising preparing a crude aqueous solution containing zirconyl ions, sulfate ions, and ions of an acid, other than sulfuric, which has a lower boiling or decomposition point than sulfuric acid and which does not form insoluble precipitates with zirconium compounds, the proportion of zirconyl ions to sulfate ions being between 2 to 3 and 4 to 1, and the concentration of zirconyl ions being such that the zirconium dioxide content is between 100 and 400 grams per liter of liquor, evaporating said solution to dryness, calcining the residue at a temperature between 150° and 650° C. to form a precipitate of insoluble zirconium oxysulfate, leaching to dissolve impurities, and separating said precipitate from the dissolved impurities.

3. The method of purifying crude zirconium compounds or ores, comprising preparing a crude aqueous mixture containing zirconyl ions, sulfate ions, and chloride ions, the proportion of zirconyl ions to sulfate ions being between 2 to 3 and 4 to 1, and the concentration of zirconyl ions being such that the zirconium dioxide content is between 100 and 400 grams per liter of liquor, evaporating said mixture to dryness at a temperature between 90° and 850° C. to form a precipitate of insoluble zirconium oxysulfate, leaching to dissolve impurities and separating said precipitate from the dissolved impurities.

4. The method of purifying crude zirconium compounds or ores, comprising preparing a crude aqueous solution containing zirconyl ions, sulfate ions, and chloride ions, the proportion of zirconyl ions to sulfate ions being between 2 to 3 and 4 to 1, and the concentration of zirconyl ions being such that the zirconium dioxide content is between 100 and 400 grams per liter of liquor, evaporating said solution to dryness, calcining the residue at a temperature between 150° and 650° C. to form a precipitate of insoluble zirconium oxysulfate, leaching to dissolve impurities, and separating said precipitate from the dissolved impurities.

5. The method of purifying crude zirconium compounds or ores, comprising preparing a crude aqueous solution containing zirconyl ions, sulfate ions, and chloride ions, the proportion of zirconyl ions to sulfate ions being between 2 to 3 and 4 to 1, and the concentration of zirconyl ions being such that the zirconium dioxide content is between 100 and 400 grams per liter of liquor, evaporating said solution to dryness, calcining the residue at a temperature between 150° and 650° C. to form a precipitate of insoluble zirconium oxysulfate, leaching with dilute hydrochloric acid to dissolve impurities, and separating said precipitate from the dissolved impurities.

6. The method of preparing improved zirconium dioxide of high purity from crude zirconium compounds or ores, comprising preparing a crude aqueous solution containing zirconyl ions, sulfate ions, and chloride ions, the proportion of zirconyl ions to sulfate ions being between 2 to 3 and 4 to 1, and the concentration of zirconyl ions being such that the zirconium dioxide content is between 100 and 400 grams per liter of liquor, evaporating said solution to dryness, calcining the residue at a temperature between 150° and 650° C. to form a precipitate of insoluble zirconium oxysulfate, leaching with dilute hydrochloric acid to dissolve impurities, separating precipitate from the dissolved impurities, and calcining said precipitate at a temperature above 900° C. to form zirconium dioxide.

7. The method of preparing improved zirconium dioxide of high purity from crude zirconium compounds or ores, comprising preparing a crude aqueous solution containing zirconyl ions, sulfate ions, and chloride ions, the proportion of zirconyl ions to sulfate ions being between 2 to 3 and 4 to 1, and the concentration of zirconyl ions being such that the zirconium dioxide content is between 100 and 400 grams per liter of liquor, separating insoluble impurities from said solution, evaporating said solution to dryness, calcining the residue at a temperature between 150° and 650° C. to form a precipitate of insoluble zirconium oxysulfate, leaching with dilute hydrochloric acid to dissolve impurities, heating said precipitate with water at 40° to 80° C. to coagulate said precipitate, separating said precipitate from the dissolved impurities, and calcining said precipitate at a temperature above 900° C. to form zirconium dioxide.

8. The method of purifying crude zirconium compounds or ores, comprising roasting crude zirconium oxide ore, containing not more than 10% silica and not more than 3% titania, with a material taken from the class consisting of the oxides, hydroxides and carbonates of the alkali metals and alkaline earth metals, to form a zirconate of a metal of said class, dissolving said zirconate in hydrochloric acid, to form a solution having a $ZrO_2$ concentration between 100 and 400 grams per liter, adding sulfate ions to said solution in an amount such that the proportion of zirconyl ions to sulfate ions is between 2 to 3 and 4 to 1, heating said solution at a temperature between 90° C. and 850° C. to form a precipitate of insoluble zirconium oxysulfate, leaching to dissolve impurities, and separating said precipitate from the dissolved impurities.

9. The method of purifying crude zirconium compounds or ores, comprising roasting crude zirconium oxide ore, containing not more than 10% silica and not more than 3% titania, with sodium carbonate to form sodium zirconate, dissolving said zirconate in hydrochloric acid, to form a solution having a $ZrO_2$ concentration between 100 and 400 grams per liter, adding sulfate ions to said solution in an amount such that the proportion of zirconyl ions to sulfate ions is between 2 to 3 and 4 to 1, heating said solution at a temperature between 90° C. and 850° C. to form a precipitate of insoluble zirconium oxysulfate, leaching to dissolve impurities, and separating said precipitate from the dissolved impurities.

10. The method of purifying crude zirconium compounds or ores, comprising roasting crude zirconium oxide ore, containing not more than 10% silica and not more than 3% titania, with a mixture of calcium carbonate and sodium carbonate to form a mixture of calcium zirconate and sodium zirconate, dissolving said zirconate in hydrochloric acid, to form a solution having a $ZrO_2$ concentration between 100 and 400 grams per liter, adding sulfate ions to said solution in an amount such that the proportion of zirconyl ions to sulfate ions is between 2 to 3 and 4 to 1, heating said solution at a temperature between 90° C. and 850° C. to form a precipitate of insoluble zirconium oxysulfate, leaching to dissolve impurities, and separating said precipitate from the dissolved impurities.

11. The method of purifying crude zirconium compounds or ores, comprising roasting crude zirconium oxide ore, containing not more than 10% silica and not more than 3% titania, with a material taken from the class consisting of the oxides, hydroxides and carbonates of the alkali metals and alkaline earth metals, to form a zirconate of a metal of said class, treating said zirconate with water to hydrolyze to acid-soluble zirconia, dissolving said acid-soluble zirconia in hydrochloric acid, to form a solution having a $ZrO_2$ concentration between 100 and 400 grams per liter, adding sulfate ions to said solution in an amount such that the proportion of zirconyl ions to sulfate ions is between 2 to 3 and 4 to 1, evaporating said solution to dryness, calcining the residue at a temperature between 150° and 650° C. to form a precipitate of insoluble zirconium oxysulfate, leaching with dilute hydrochloric acid to dissolve impurities, and separating said precipitate from the dissolved impurities.

12. The method of preparing improved zirconium dioxide of high purity from crude zirconium compounds or ores, comprising roasting crude zirconium oxide ore, containing not more than 10% silica and not more than 3% titania, with sodium carbonate to form sodium zirconate, treating said zirconate with water to hydrolyze to acid-soluble zirconia, dissolving said acid-soluble zirconia in hydrochloric acid, to form a solution having a $ZrO_2$ concentration between 100 and 400 grams per liter, adding sulfate ions to said solution in an amount such that the proportion of zirconyl ions to sulfate ions is between 2 to 3 and 4 to 1, separating insoluble impurities from said solution, evaporating said solution to dryness at a temperature between 90° and 850° C. to form a precipitate of insoluble zirconium oxysulfate, leaching with dilute hydrochloric acid to dissolve impurities, heating said precipitate with water at 40° to 80° C. to coagulate said precipitate, separating said precipitate from the dissolved impurities, and calcining said precipitate at a temperature above 900° C. to form zirconium dioxide.

13. The method of preparing improved zirconium dioxide of high purity from crude zirconium compounds or ores, comprising roasting crude zirconium oxide ore, containing not more than 10% silica and not more than 3% titania, with sodium carbonate to form sodium zirconate, treating said zirconate with water to hydrolyze to acid-soluble zirconia, dissolving said acid-soluble zirconia in hydrochloric acid, to form a solution having a $ZrO_2$ concentration between 100 and 400 grams per liter, adding sulfate ions to said solution in an amount such that the proportion of zirconyl ions to sulfate ions is between 2 to 3 and 4 to 1, separating insoluble impurities from said solution, evaporating said solution to dryness, calcining the residue at a temperature between 150° and 650° C. to form a precipitate of insoluble zirconium oxysulfate, leaching with dilute hydrochloric acid to dissolve impurities, heating said precipitate with water at 40° to 80° C. to coagulate said precipitate, separating said precipitate from the dissolved impurities, and calcining said precipitate at a temperature above 900° C. to form zirconium dioxide.

EUGENE WAINER.